United States Patent
Moon et al.

(10) Patent No.: US 12,504,413 B2
(45) Date of Patent: Dec. 23, 2025

(54) FRAGRANCE PROPERTY PREDICTION SYSTEM BASED ON PHYSICOCHEMICAL AND PERCEPTUAL PROPERTY DATABASE

(71) Applicant: DAEGU GYEONGBUK INSTITUTE OF SCIENCE AND TECHNOLOGY, Daegu (KR)

(72) Inventors: Che Il Moon, Daegu (KR); Ji Sub Bae, Changwon-si (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 309 days.

(21) Appl. No.: 18/233,373

(22) Filed: Aug. 14, 2023

(65) Prior Publication Data
US 2024/0060947 A1    Feb. 22, 2024

(30) Foreign Application Priority Data
Aug. 19, 2022 (KR) .................. 10-2022-0103950

(51) Int. Cl.
*G06F 16/28* (2019.01)
*G01N 33/00* (2006.01)

(52) U.S. Cl.
CPC ....... *G01N 33/0062* (2013.01); *G06F 16/283* (2019.01); *G01N 33/0068* (2024.05)

(58) Field of Classification Search
CPC ............ G01N 33/0062; G01N 33/0068; G06F 16/283; G16C 20/30; G16C 20/70; G16C 20/90
See application file for complete search history.

(56) References Cited

U.S. PATENT DOCUMENTS

| | | | |
|---|---|---|---|
| 5,602,755 A * | 2/1997 | Ashe | ............... G01N 33/2829 702/30 |
| 2002/0052694 A1* | 5/2002 | McGregor | ............. G16C 20/62 702/19 |

(Continued)

FOREIGN PATENT DOCUMENTS

| | | |
|---|---|---|
| KR | 10-2016-0105238 | 9/2016 |
| KR | 10-2021-0119479 | 10/2021 |

OTHER PUBLICATIONS

ChemEssen, Inc., Mol-Instincts Leaflet (Year: 2022).*

(Continued)

*Primary Examiner* — David J Bolduc
(74) *Attorney, Agent, or Firm* — LEX IP MEISTER, PLLC

(57) ABSTRACT

According to the present disclosure, there is provided a fragrance property prediction system, including a data converter configured to analyze high-dimensional physicochemical property data matched to a plurality of fragrances through a principal component analysis technique and project the analyzed data into three-dimensional data on a three-dimensional physicochemical property coordinate system, a grouping unit configured to group three-dimensional coordinates for each fragrance in the three-dimensional physicochemical property coordinate system for each perceptual property category based on perceptual property category information previously matched for each fragrance and configured to calculate a centroid coordinate for each grouped perceptual property category, and a controller configured to convert a physicochemical property vector of unknown fragrance into the three-dimensional coordinate in the three-dimensional physio-chemical coordinate system, and predict a perceptual property category of the unknown fragrance based on a distance between the converted three- (Continued)

dimensional coordinate and a centroid for each perceptual property category.

6 Claims, 6 Drawing Sheets

(56) References Cited

U.S. PATENT DOCUMENTS

| | | | | |
|---|---|---|---|---|
| 2003/0014191 A1* | 1/2003 | Agrafiotis | ............... | G06F 18/40 |
| | | | | 703/11 |
| 2003/0180808 A1* | 9/2003 | Natsoulis | ............... | G16C 20/70 |
| | | | | 435/7.1 |
| 2006/0080073 A1* | 4/2006 | Kotani | ................... | G16C 20/30 |
| | | | | 703/12 |
| 2011/0172931 A1* | 7/2011 | Murthy | .................. | G16C 20/20 |
| | | | | 512/1 |
| 2013/0236417 A1* | 9/2013 | Ray | ......................... | A01M 1/02 |
| | | | | 43/107 |
| 2015/0199608 A1* | 7/2015 | Pinel | .................... | G06Q 10/067 |
| | | | | 706/46 |
| 2017/0247145 A1* | 8/2017 | Reisacher | ................ | A61K 8/35 |
| 2018/0071425 A1* | 3/2018 | Jin | .......................... | A61L 9/125 |
| 2018/0253534 A1* | 9/2018 | Sobel | ....................... | C11B 9/02 |
| 2018/0362893 A1* | 12/2018 | Breckwoldt | ............ | C11D 3/48 |
| 2019/0156224 A1* | 5/2019 | Cecchi | ..................... | G16C 20/64 |
| 2020/0075134 A1* | 3/2020 | Shiba | ...................... | G16C 20/70 |
| 2020/0234798 A1* | 7/2020 | Denmark | ............... | G16C 20/64 |
| 2020/0294630 A1* | 9/2020 | Miller | ..................... | G16C 20/50 |
| 2022/0130493 A1* | 4/2022 | Turner | .................... | G16H 70/40 |
| 2022/0139504 A1* | 5/2022 | Wiltschko | ............. | G16C 20/70 |
| | | | | 706/21 |
| 2023/0012059 A1* | 1/2023 | Dubreuil | .................. | C11B 9/00 |
| 2023/0020302 A1* | 1/2023 | Warr | ..................... | G01N 33/0001 |
| 2023/0085282 A1* | 3/2023 | Ihara | ..................... | G06N 20/20 |
| | | | | 600/303 |
| 2023/0119369 A1* | 4/2023 | Tchakalova | ............ | G16C 20/30 |
| | | | | 702/3 |
| 2023/0253075 A1* | 8/2023 | Shcherbakov | ............ | B01L 5/02 |
| | | | | 702/27 |
| 2023/0360744 A1* | 11/2023 | Sala | ....................... | G06Q 10/04 |
| 2024/0013866 A1* | 1/2024 | Lee | ......................... | G16C 20/30 |
| 2024/0170107 A1* | 5/2024 | Silver | .................... | G16C 20/70 |
| 2024/0202741 A1* | 6/2024 | Robvieux | ............... | G06F 16/22 |
| 2024/0321405 A1* | 9/2024 | Sala | ........................ | G16C 20/30 |

OTHER PUBLICATIONS

Sun-Tae Kim et al., "Identification of multi-concentration aromatic fragrances with electronic nose technology using a support vector machine", Analytical Methods, vol. 13, No. 40, Oct. 28, 2021, pp. 4710-4717.

Rinu Chacko et al., "Data based predictive models for odor perception", Scientific Reports, 10, 17136 (2020), Oct. 13, 2020, total 13 pages.

* cited by examiner

[FIG. 1]
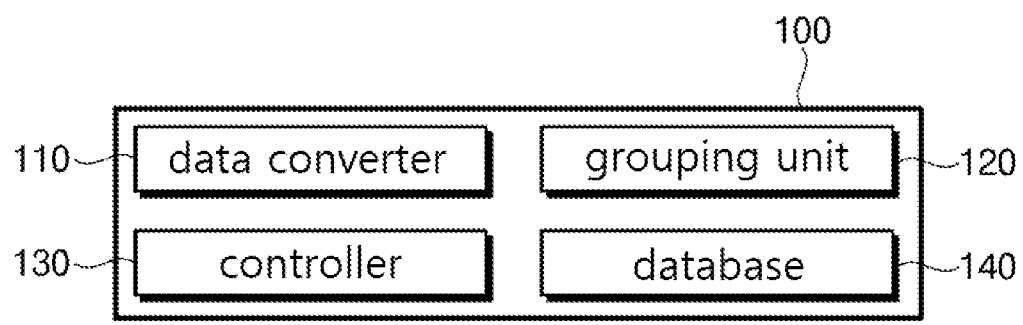

[FIG. 2]
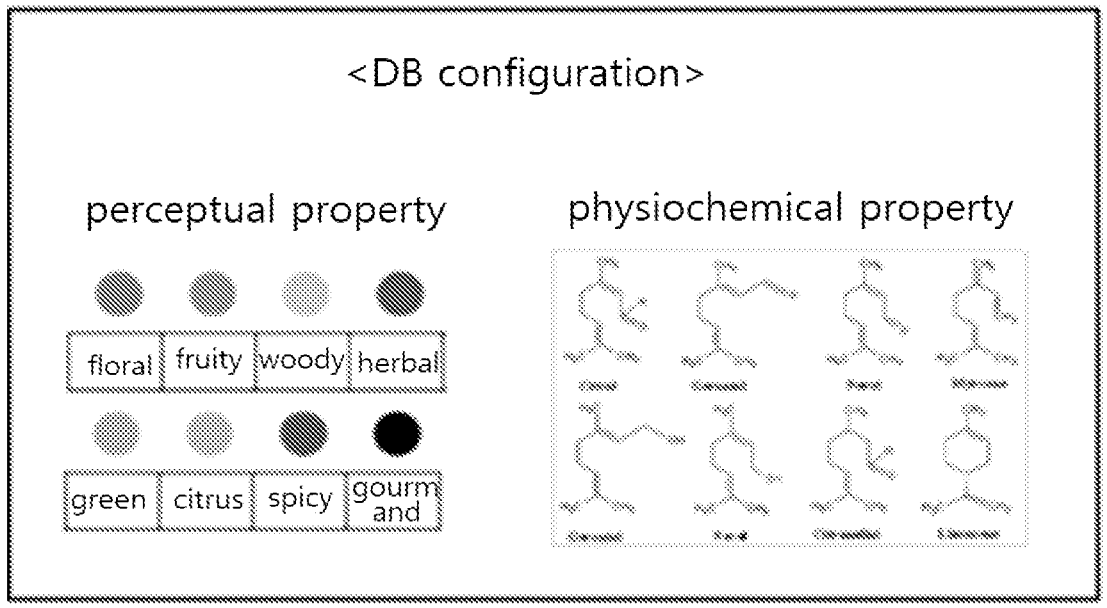
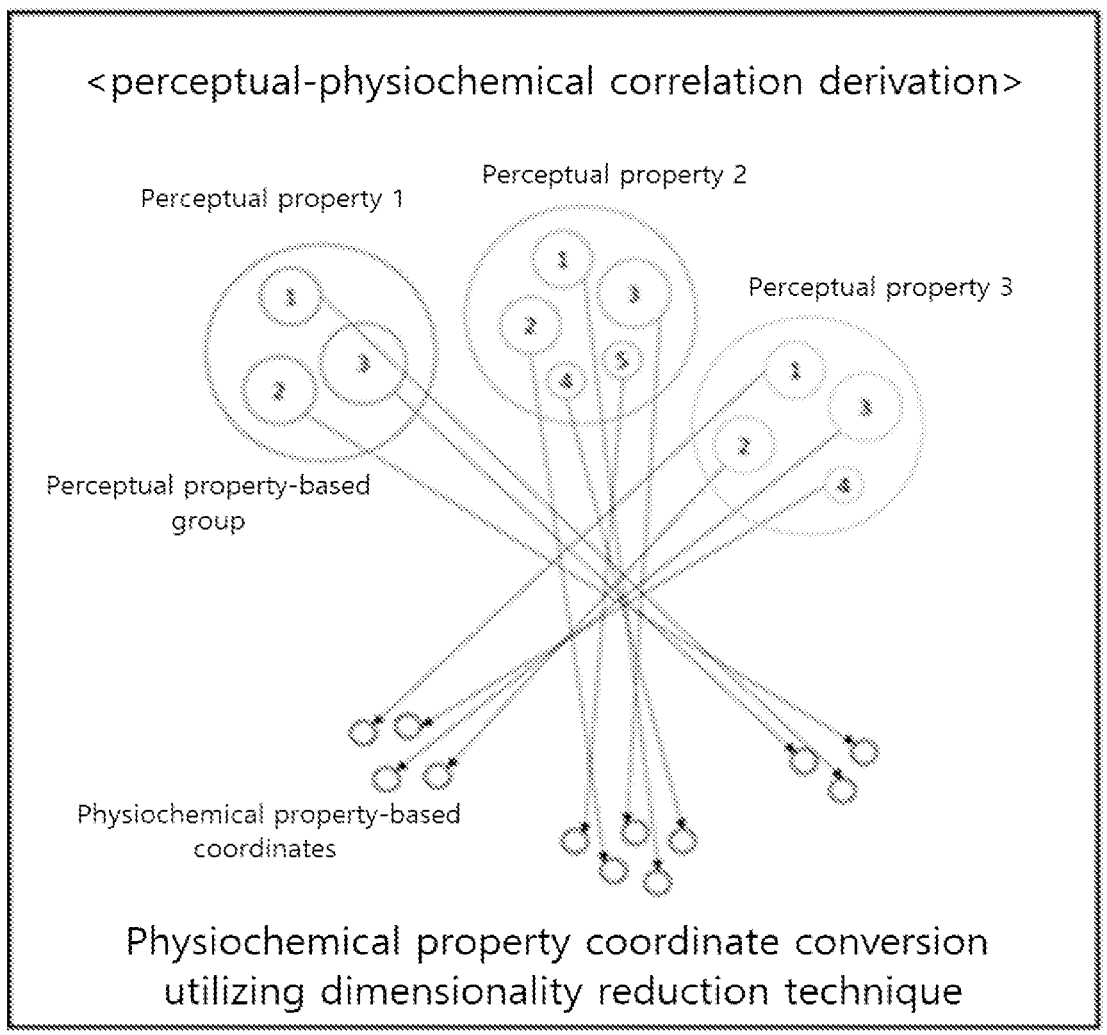

[FIG. 3]
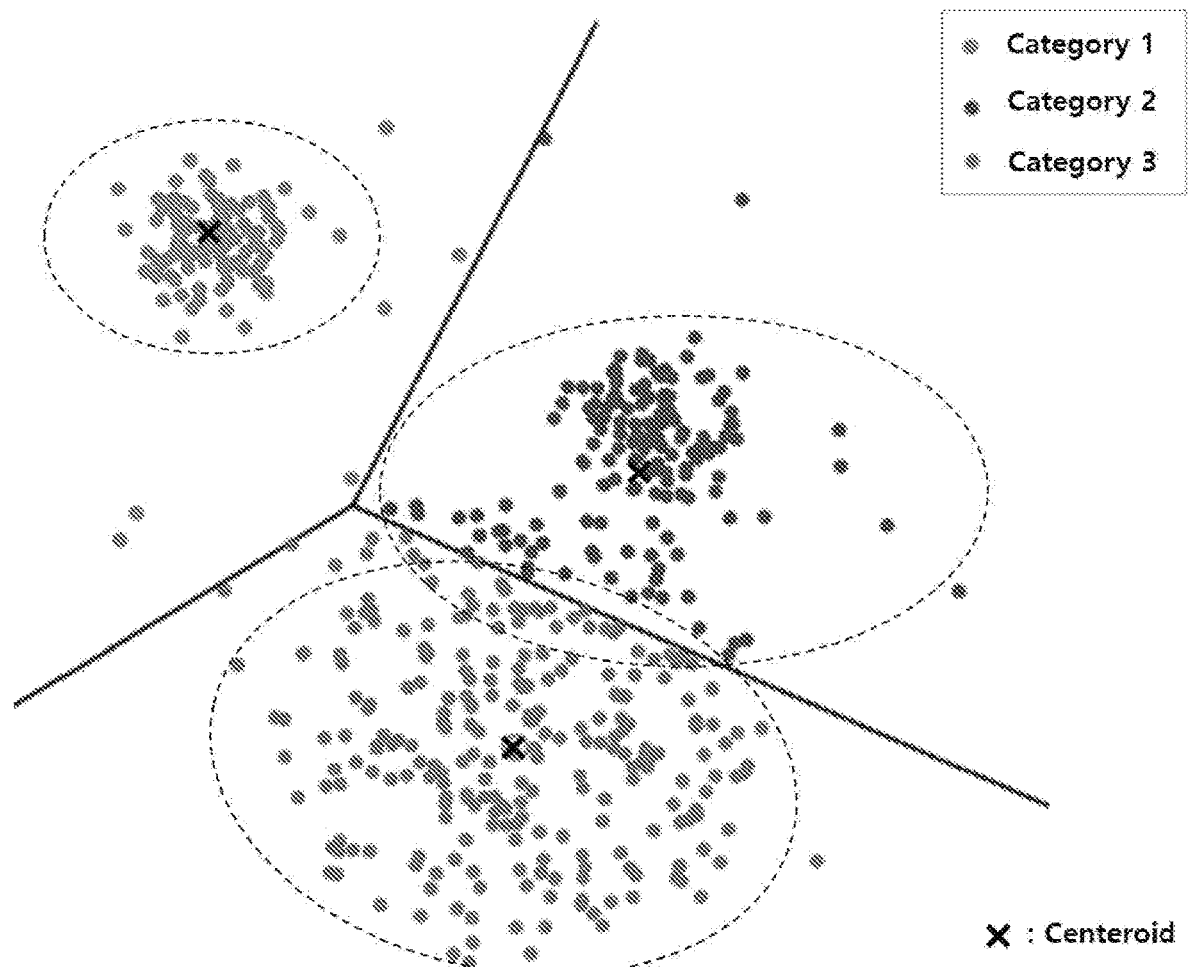

[FIG. 4]
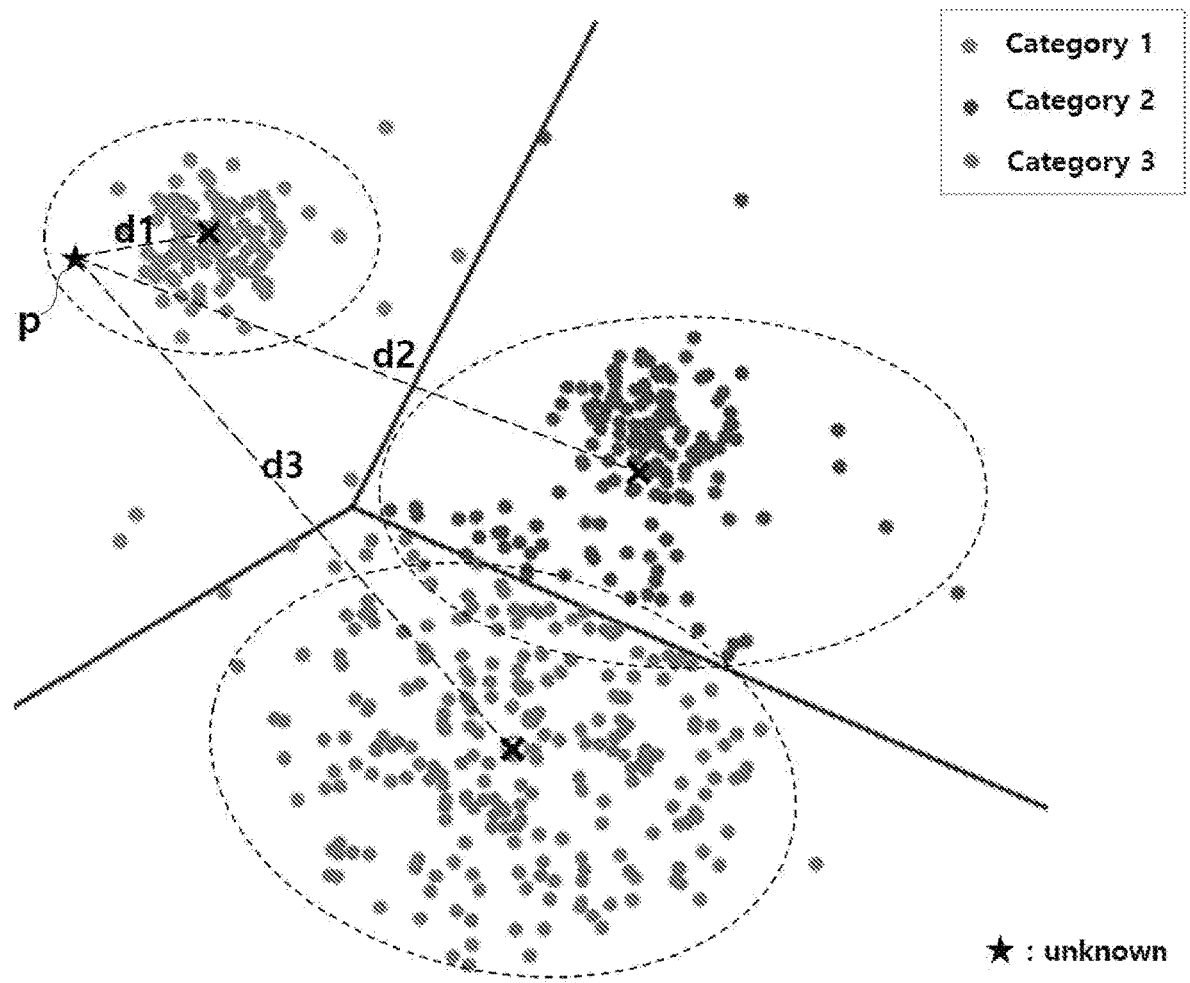

[FIG. 5]
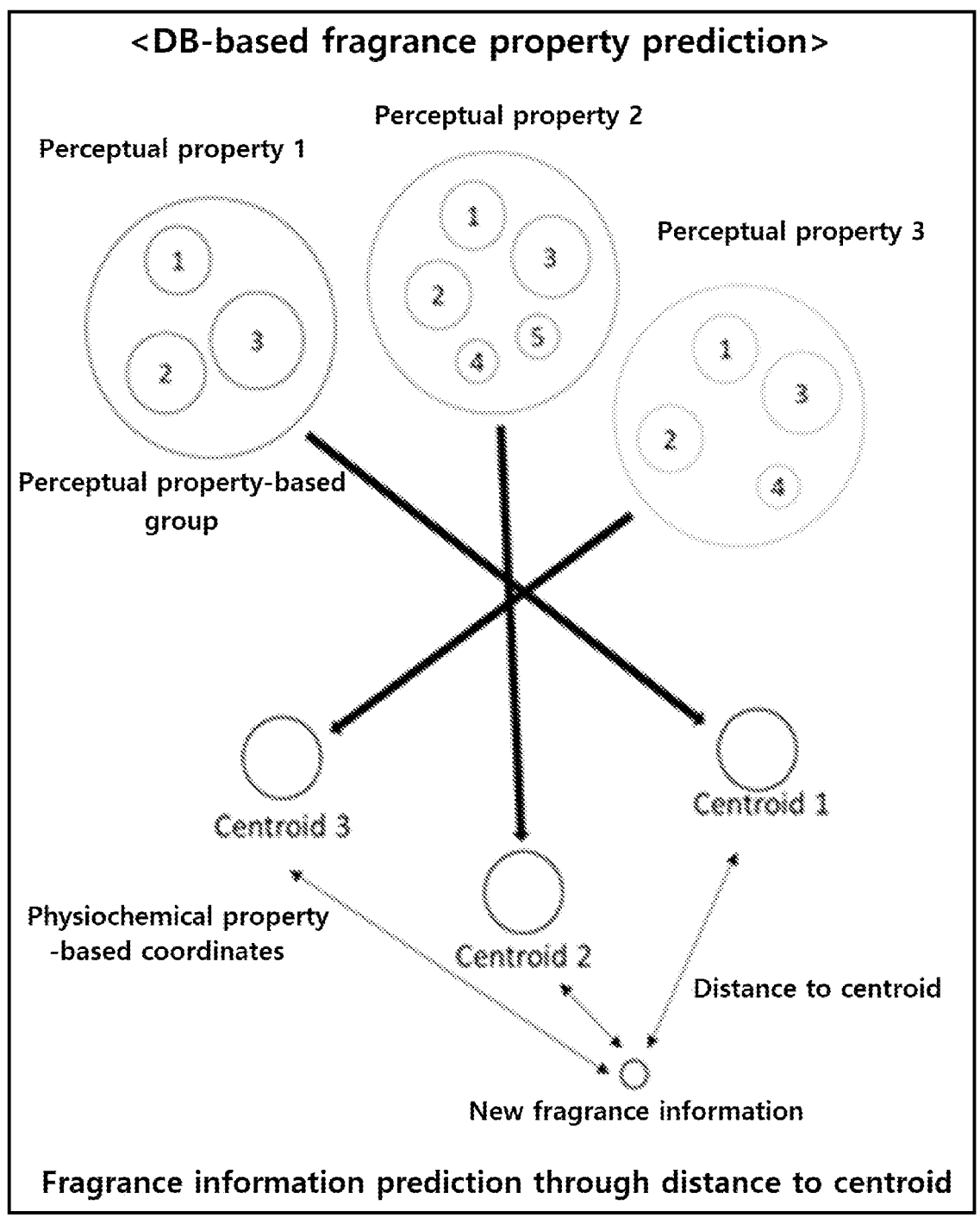

[FIG. 6]
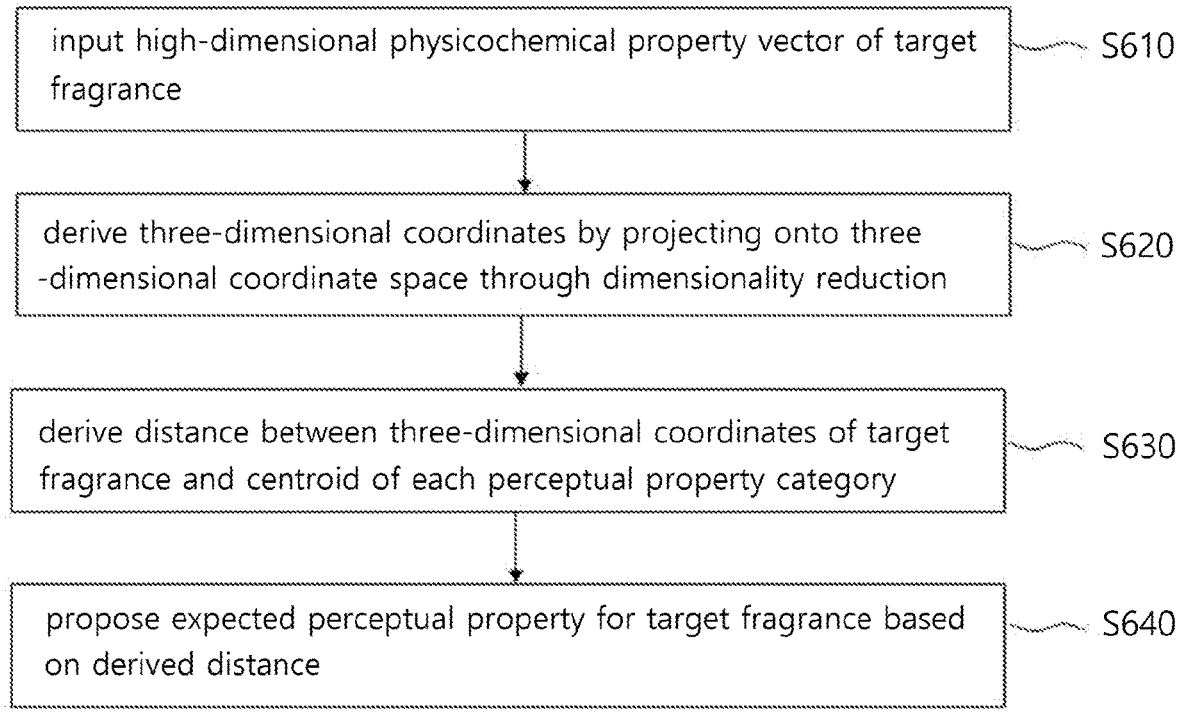
[FIG. 7]
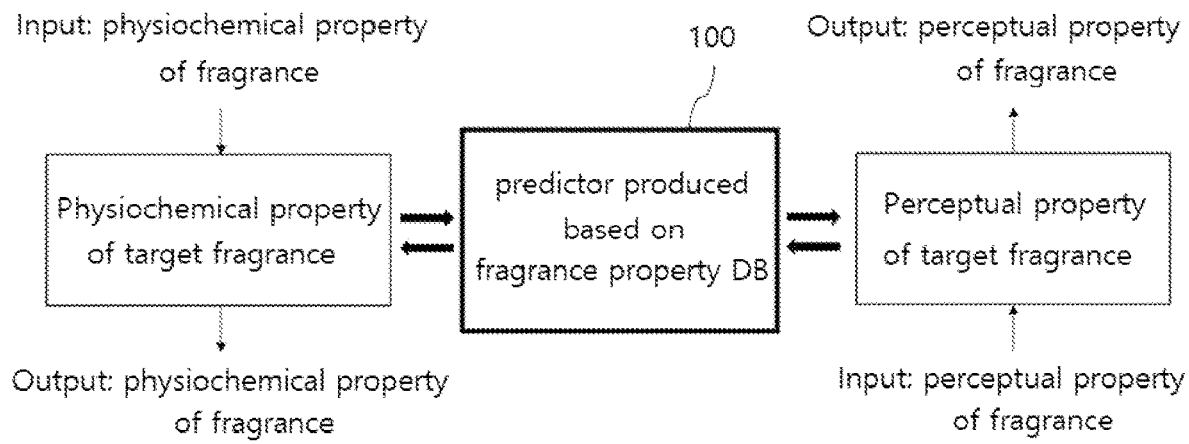

FRAGRANCE PROPERTY PREDICTION SYSTEM BASED ON PHYSICOCHEMICAL AND PERCEPTUAL PROPERTY DATABASE

CROSS-REFERENCE TO RELATED APPLICATION

This application is based on and claims priority under 35 U.S.C. § 119 to Korean Patent Application No. 10-2022-0103950, filed on Aug. 19, 2022, in the Korean Intellectual Property Office, the disclosure of which is incorporated by reference herein in its entirety.

BACKGROUND

The present disclosure relates to a fragrance property prediction system based on a physicochemical and perceptual property database, and more particularly, to a fragrance property prediction system capable of predicting perceptual property of new fragrance from physicochemical property of the new fragrance based on a correlation between the physicochemical property of fragrance and perceptual property of fragrance.

When producing a specific fragrance in the perfume industry, the producing relies on the experience of a chemist. This is because it is difficult to grasp the basic property of newly produced fragrances and it is difficult for a field industry to utilize related information universally.

It is very important to predict a correlation between a physicochemical structure of fragrance and a specific perceptual response when actually producing fragrance. However, when compared to this importance, research on what kind of perceptual response is induced by chemicals at the physicochemical level has not been conducted so far, and related technology development is also insufficient.

Accordingly, several methodologies have been proposed to quantify and measure the property of fragrance. Largely, there were technology that helps to select fragrance through an appropriate analysis procedure for data such as survey, and technology that tries quantification by using bio-signals, and so on. Among the technologies, technology that helps to select fragrance through survey or data analysis such as bio-signals provides objective and accurate data, and accordingly, the technology has an effect of reducing the amount of resources and effort to be required, but is not a perfect prediction system.

In addition, a prediction system using the technology has been proposed, and for example, there is a method of evaluating preference through an algorithm by using a physicochemical signal detected from an electronic nose. However, the electronic nose may perform objective preference evaluation of the fragrance itself, but may not perform perceptual category evaluation of the fragrance. Therefore, there is a need for a new fragrance property prediction technique that may predict fragrance information based on a correlation between a physicochemical structure and perceptual property of fragrance.

The background technology of the present disclosure is disclosed in Korean Patent Publication No. 2016-0105238 (published on Sep. 6, 2016).

SUMMARY

The present disclosure provides a fragrance property prediction system based on a physicochemical and perceptual property database that may predict the perceptual property of a new fragrance from the physicochemical property of new fragrance based on a correlation between the physiochemical property of fragrance and perceptual property of the fragrance.

According to the present disclosure, a fragrance property prediction system based on a physiochemical and perceptual property database includes a data converter configured to analyze high-dimensional physicochemical property data matched to a plurality of fragrances through a principal component analysis technique and project the analyzed data into three-dimensional data on a three-dimensional physicochemical property coordinate system, a grouping unit configured to group three-dimensional coordinates for each fragrance in the three-dimensional physicochemical property coordinate system for each perceptual property category based on perceptual property category information previously matched for each fragrance and configured to calculate a centroid coordinate for each grouped perceptual property category, and a controller configured to receive a physicochemical property vector of unknown fragrance and convert the physicochemical property vector into the three-dimensional coordinate in the three-dimensional physio-chemical coordinate system, and predict a perceptual property category of the unknown fragrance based on a distance between the converted three-dimensional coordinate and a centroid for each perceptual property category.

Also, the fragrance property prediction system may further include a database configured to match high-dimensional physicochemical property data corresponding to the fragrance with perceptual property category information of the fragrance for each of the plurality of fragrances and store the matched data.

Also, the database may utilize a MOL-instincts database which is a physicochemical property database, and an international fragrance association (IFRA) database which is a perceptual property database.

Also, the grouping unit may label perceptual property category information to which a corresponding fragrance belongs to each fragrance in the three-dimensional physicochemical property coordinate system, based on the perceptual property category information previously matched for each fragrance, and group respective fragrances for each category through an AdaBoost algorithm by using a position of each labeled fragrance.

Also, the grouping unit may obtain a centroid coordinate for each perceptual property category by averaging three-dimensional coordinate positions of respective fragrances classified into the same perceptual property category.

Also, the controller may calculate a distance d between a three-dimensional coordinate p on a three-dimensional physicochemical coordinate system of unknown fragrance and a centroid coordinate q of the perceptual property category through a following equation, $$d = |p - q| = \sqrt{(y_{1(p)} - y_{1(q)})^2 + (y_{2(p)} - y_{2(q)})^2 + (y_{3(p)} - y_{3(q)})^2}$$

where, $y_{1(p)}$, $y_{2(p)}$, and $y_{3(p)}$ are the three-dimensional coordinates p of the unknown fragrance, and $y_{1(c)}$, $y_{2(q)}$, and $y_{3(q)}$ indicate centroid coordinates of perceptual property categories.

Also, the controller may quantify the calculated distance (d=Ds) by using an equation below, compare the calculated quantification distances for each category with each other, and classify the perceptual property categories of the unknown fragrance, $$d' = \left(1 - \frac{D_s}{D}\right) \times 100 \, (\%).$$

where, d' indicates a quantification distance, and D indicates a reference distance from the three-dimensional coordinate p of the unknown fragrance to an original coordinate (0,0,0).

Also, the controller may finally derive a perceptual property category from which a shortest distance is derived among a plurality of perceptual property categories as the perceptual property category of the unknown fragrance.

According to the present disclosure, it is possible to quickly and easily predict the perceptual property of fragrance from the physicochemical property of new fragrance based on a result of analyzing a correlation between the physicochemical property of fragrance and the perceptual property of the fragrance.

Accordingly, it is possible to synthesize new optimal fragrance through prediction based on preference and fragrance recognition in the fragrance synthesis industry.

In addition, when trying to produce similar fragrances, a fragrance candidate list may be proposed, and through the above effects, resources and efforts required for fragrances, food, chemicals, and odor evaluation industries may be reduced.

BRIEF DESCRIPTION OF THE DRAWINGS

Embodiments will be more clearly understood from the following detailed description taken in conjunction with the accompanying drawings in which:

FIG. 1 is a diagram illustrating a configuration of a fragrance property prediction system according to an embodiment of the present disclosure;

FIG. 2 illustrates concept of converting high-dimensional physiochemical property data for fragrance of each category into low-dimensional coordinate system data, according to an embodiment of the present disclosure;

FIG. 3 illustrates a result of grouping respective fragrances on a three-dimensional physiochemical property coordinate system for each perceptual property category, according to an embodiment of the present disclosure;

FIG. 4 illustrates a principle of predicting a perceptual property category by projecting a physicochemical property vector of unknown fragrance onto a three-dimensional space, according to an embodiment of the present disclosure;

FIG. 5 conceptually illustrates a fragrance property prediction principle according to an embodiment of the present disclosure;

FIG. 6 is a flowchart illustrating a fragrance property prediction operation according to an embodiment of the present disclosure; and FIG. 7 is a diagram conceptually illustrating a bidirectional fragrance property predictor based on a fragrance property prediction system according to an embodiment of the present disclosure.

DETAILED DESCRIPTION OF THE EMBODIMENTS

Then, embodiments of the present disclosure are described in detail with reference to the accompanying drawings such that those skilled in the art to which the present disclosure belongs may easily practice the present disclosure. However, the present disclosure may be implemented in many different forms and is not limited to the embodiments described herein. In addition, in order to clearly describe the present disclosure with reference to the drawings, parts irrelevant to the description are omitted, and similar reference numerals are attached to similar parts throughout the specification.

Throughout the specification, when a portion is described to be "connected" to another portion, this includes not only a case in which the portion is "directly connected" thereto but also a case in which the portion is "electrically connected" thereto with another component therebetween. In addition, when a certain portion is described to "include" a certain component, this means that the certain portion may further include other components without excluding the certain component unless otherwise stated.

FIG. 1 is a diagram illustrating a configuration of a fragrance property prediction system according to an embodiment of the present disclosure.

As illustrated in FIG. 1, the fragrance property prediction system 100 according to an embodiment of the present disclosure may include a data converter 110, a grouping unit 120, a controller 130, and a database 140. Here, operations of the data converter 110, the grouping unit 120, and the database 140 and data flow therebetween may be controlled by the controller 130.

The data converter 110 may analyze high-dimensional physiochemical property data matched to fragrance for each of a plurality of fragrances by using a principal component analysis (PCA) technique and projects the analyzed data to three-dimensional data onto a three-dimensional physiochemical property coordinate system.

Here, physicochemical property data of fragrance and perceptual property category information to which the corresponding fragrance belongs may be utilized as data of the database 140.

The database 140 matches high-dimensional physicochemical property data corresponding to fragrance with perceptual property category information of the fragrance for each fragrance and stores the matched data. The database 140 may be included in the fragrance property prediction system 100 or may be connected to the fragrance property prediction system 100 through a wired or wireless network.

An embodiment of the present disclosure provides a fragrance property prediction system using a pre-constructed physicochemical property database and a perceptual property database and may analyze a correlation between the physiochemical property of fragrance and perceptual property of fragrance by utilizing the known database previously constructed in relation to the fragrance and simply inserting the physicochemical property of the unknown new fragrance into a analysis algorithm based thereon, and accordingly, perceptual property of the fragrance may be quickly predicted.

In the embodiment of the present disclosure, the high-dimensional physicochemical property of fragrance may refer to a plurality of multidimensional properties including molecular structure, molecular formula, carbon number, functional group type, and mass of a fragrance material, and the perceptual property of fragrance may refer to the type (category) of fragrance (for example, banana flavor, raspberry flavor, or so on) that a person feels, that is, recognizes.

Here, the database 140 may utilize MOL-instincts database as the high-dimensional physiochemical property data database (chemical compounds database) and utilize an international fragrance association (IFRA) database as the perceptual property database.

The Mol-Instincts database provides more than 2,100 pieces of physical property information (2,100-dimensional physical property property) per a chemical substance such as fragrance, that is, provides high-dimensional physiochemical property, and property values of each dimension may be provided in a numerical form. The IFRA database may correspond to a database provided by the International Fragrance Association, reference data, and so on.

The database 140 may match high-dimensional physiochemical property data of a corresponding fragrance substance with perceptual property corresponding thereto for each type of fragrance by utilizing data of the databases, store and manages the matched data, and provide the related information to the converter 110, the grouping unit 120, and the controller 130 to be used for data processing, analysis, calculation, and so on required by the respective units. The data stored in the database 140 may also be updated and reinforced at any time.

FIG. 2 illustrates concept of converting high-dimensional physiochemical property data for fragrance of each category into low-dimensional coordinate system data, according to an embodiment of the present disclosure.

An upper figure of FIG. 2 is an example of a configuration of the database 140 in which physicochemical property and perceptual property are stored for each fragrance, and a lower figure conceptually shows an operation of the data converter 110 that maps the high-dimensional physiochemical property of each flavor to another low-dimensional coordinate system space through a dimensionality reduction technique.

In the embodiment of the present disclosure, the data converter 110 projects the high-dimensional physiochemical property data of each of a plurality of fragrances onto three-dimensional coordinates in a three-dimensional space based on a principal component analysis technique. Accordingly, coordinates of each fragrance are mapped on the three-dimensional space, and the high-dimensional physiochemical property (for example, 2100-dimensional property) of each fragrance may be simplified and expressed as coordinate values of the three-dimensional physicochemical property (three-dimensional property).

The dimensionality reduction technique is the known technique, and a method of constructing a physiochemical property coordinate system by using dimensionality reduction is as follows.

A data matrix X, which is a physicochemical property of a database, has n repetitions and p results. A matrix W is defined by a set of p-dimensional vectors of a weight and a load. Principal component scores newly mapped through linear transformation by the matrix W are represented by a matrix T. Each variable of T is a data set that is the greatest variance from X, and a load vector W is limited to a unit vector.

The k-th principal component may be obtained by subtracting a (k−1)-th principal component from X as represented by Equation 1 below.

$$X_k = X - \sum_{s=1}^{k-1} X w_{(s)} w_{(s)}^T \qquad \text{Equation 1}$$

The greatest variance of a new data matrix may be extracted by Equation 2 below.

$$w_{(k)} = \arg\max_{\|w\|=1} \{\|X_k w\|^2\} = \arg\max \left\{ \frac{w^T X_k^T X_k w}{w^T w} \right\} \qquad \text{Equation 2}$$

The entire principal component decomposition of X using the defined matrix W may be represented by Equation 3.

$$T = XW \qquad \text{Equation 3}$$

W is a p×p matrix in which eigenvectors of $X^T X$ are composed of columns. Data converted according to the above process may be extracted from principal components k=1 to k=3 and returned to low-dimensional data. The returned data Y may generate three-dimensional coordinates with each principal component value as an axis.

In this way, multi-dimensional physicochemical property of fragrance may be dimensionally reduced by a dimensionality reduction technique and mapped on a three-dimensional coordinate system.

The grouping unit 120 may cluster (group) respective coordinates in a three-dimensional space for similar perceptual properties based on coordinate values for each fragrance mapped to the three-dimensional coordinate system and a perceptual property category to which each fragrance belongs.

Specifically, the grouping unit 120 groups three-dimensional coordinates for each fragrance in a three-dimensional physicochemical property coordinate system by perceptual property category based on the perceptual property category information matched by fragrance, and calculates centroid coordinates for each property category.

Here, the grouping unit 120 labels each fragrance in the three-dimensional physicochemical property coordinate system with perceptual property category information of the corresponding fragrance, and then groups each fragrance by category through an AdaBoost algorithm by using a position (coordinate position) of each labeled fragrance. The Adaboost algorithm may cluster samples through machine learning and a statistical technique.

Accordingly, fragrances mapped in the three-dimensional space may be grouped according to perceptual property categories.

The grouping unit 120 may classify fragrances by executing the AdaBoost algorithm based on positional information of the labeled fragrance by using a perceptual property database for fragrance projected onto a three-dimensional coordinate system, and may calculate a centroid by averaging positions of accurately classified fragrances among the classified fragrances through Equation 4 below.

$$\text{centroid} = \frac{1}{n}\sum_{i=1}^{n} p_i \qquad \text{Equation 4}$$

In this case, p indicates positional information (three-dimensional coordinates) of each fragrance, n indicates the number of fragrances (coordinates) in the grouped (classified) cluster, and indicates an index for the fragrance.

As such, the grouping unit 120 may obtain centroid coordinates for each perceptual property category by averaging three-dimensional coordinate positions of the respective fragrances classified into the same perceptual property category.

FIG. 3 illustrates a result of grouping respective fragrances on a three-dimensional physiochemical property coordinate system for each perceptual property category, according to an embodiment of the present disclosure.

Each fragrance coordinate projected onto the three-dimensional coordinate system is labeled as each category based on a perceptual property database that stores the perceptual property of each fragrance. In FIG. 3, perceptual property categories to which each flavor belongs are labeled with colors. It is possible to derive a correlation of each fragrance information of the labeled coordinate system and derive a centroid of physiochemical properties having a high correlation with each perceptual property by using the derived correlation information.

FIG. 3 illustrates three perceptual property categories for the sake of convenience of description. A centroid is obtained for each category by averaging positions of coordinates in the classified clusters.

The centroid coordinates obtained for each perceptual property category are used to predict perceptual properties of physical property data for new fragrance in the future.

That is, the centroid is used to predict in advance a perceptual property of the corresponding fragrance from the high-dimensional physicochemical property data of target fragrance being newly developed by using a prediction system (predictor) of the present disclosure, and a detailed operation thereof is as follows.

The controller 130 may include a processor for controlling each unit and may include a predictor for predicting fragrance information.

The controller 130 may receive a physicochemical property vector of unknown fragrance (target flavor) to be developed, convert the physicochemical property vector into three-dimensional coordinates on a three-dimensional physicochemical coordinate system through the dimensionality reduction as described above, and then predict a perceptual property category of the unknown fragrance based on a distance between the converted three-dimensional coordinates and a centroid of each perceptual property category.

In this case, the controller 130 may finally derive the perceptual property category which the shortest distance is derived among a plurality of perceptual property categories as the perceptual property category of the unknown fragrance.

When receiving the high-dimensional physicochemical property vector of the unknown fragrance through a user terminal or so on, the controller 130 transmits the high-dimensional physicochemical property vector to the data converter 110 to be projected onto the three-dimensional physicochemical property coordinate system obtained by analyzing a principal component, and accordingly, three-dimensional coordinates of the unknown fragrance mapped on the three-dimensional space may be obtained.

FIG. 4 illustrates a principle of predicting a perceptual property category by projecting a physicochemical property vector of unknown fragrance onto a three-dimensional space, according to an embodiment of the present disclosure.

As illustrated in FIG. 4, the controller 130 may calculate distances d1, d2, and d3 from a three-dimensional coordinate point (a star point p) of the unknown fragrance projected onto a three-dimensional space to a centroid of each of a plurality of perceptual property categories and may arrange the calculated distances in descending order.

For example, FIG. 4 illustrates that the distance d1 is the shortest, and accordingly, category 1 from which the shortest distance is derived may be determined as the expected perceptual property of the corresponding fragrance and provided to a user terminal as a final result, and a higher order list up to the set order among the arranged lists may be provided to the user terminal as a perceptual property candidate.

Here, the controller 130 may calculate a distance d between the three-dimensional coordinate point p on the three-dimensional physiochemical coordinate system of the unknown fragrance and a centroid coordinate q of the perceptual property category through Equation 5 below.

$$d = |p - q| = \sqrt{(y_{1(p)} - y_{1(q)})^2 + (y_{2(p)} - y_{2(q)})^2 + (y_{3(p)} - y_{3(q)})^2} \quad \text{Equation 5}$$

Here, $y_{1(p)}$, $y_{2(p)}$, and $y_{3(p)}$ are the three-dimensional coordinates p of the unknown fragrance, and $y_{1(q)}$, $y_{2(q)}$, and $y_{3(q)}$ indicate centroid coordinates of the perceptual property category.

The distance d indicates similarity that is a difference between data, which may mean that the similarity decreases as the distance increases. In this case, the distance d from odor A to a centroid may be quantified through a distance from the odor A to original coordinates (0,0,0), which is a reference odor point.

That is, the controller 130 may quantify the distance (d=Ds) calculated by Equation 5 by using a method of Equation 6 below, and compare the calculated quantification distances for each category with each other to classify perceptual property categories of the unknown fragrance.

$$d' = \left(1 - \frac{D_s}{D}\right) \times 100\ (\%). \quad \text{[Equation 6]}$$

Here, d' indicates a quantification distance, and D indicates a reference distance (a distance between p and the origin) from the three-dimensional coordinate (p) of the unknown fragrance to the original coordinates (0,0,0).

For example, the distances d1, d2, and d3 in FIG. 3 are quantified by using a value obtained by subtracting, from 1, a value obtained by dividing the distance D from the coordinate p of the unknown fragrance to the original coordinates (0,0,0), and a category corresponding to the shortest distance among the quantified distances d' (d1', d2', and d3') is determined as a category having the highest correlation with the corresponding fragrance coordinates.

In this way, according to the present disclosure, it is possible to predict and present the perceptual property expected to be included in the corresponding fragrance by using only the physicochemical property data of unknown fragrance under development, that is, a target flavor. That is, the present disclosure may infer fragrance information through a correlation between physicochemical information and perceptual information, which are two data sets of different categories.

FIG. 5 conceptually illustrates a fragrance property prediction principle according to an embodiment of the present disclosure FIG. 5 illustrates a summary of an operation of the present system.

First, high-dimensional physicochemical property data of each known fragrance is projected onto three-dimensional coordinates by using a dimensionality reduction technique, and a centroid of each category is obtained by using a result of grouping coordinates of each fragrance in a three-dimensional space for each perceptual property category.

Thereafter, when physicochemical property information on new fragrance is input, the physicochemical property information is projected onto the previously obtained three-dimensional coordinate system space to obtain three-dimensional coordinates thereof, and a perceptual category from which the shortest distance is derived is predicted as the perceptual property of new fragrance by calculating a distance between the three-dimensional coordinates representing physical property of the new fragrance and a centroid of each category previously obtained. The prediction result may be provided to a user terminal, a display included in the system, or so on.

FIG. 6 is a flowchart illustrating a fragrance property prediction operation according to an embodiment of the present disclosure. Referring to FIG. 6, first, the fragrance property prediction system 100 receives physicochemical property information on new fragrance, that is, target fragrance (S610). The physicochemical property information input to a predictor may correspond to data that represents high-dimensional physicochemical property data of the target fragrance in the form of a matrix or so on.

Then, the dimensionally reduced physicochemical property information on the input target fragrance is projected onto a three-dimensional physiochemical property coordinate system to obtain three-dimensional coordinates representing the physical property of the target fragrance (S620).

Thereafter, a distance between the three-dimensional coordinates of the target fragrance and a centroid of each perceptual property category is derived (S630), and an expected perceptual property category for the target fragrance is suggested based on the derived distance (S640).

The fragrance property prediction system according to an embodiment of the present disclosure may be applied as a system for predicting bidirectional fragrance property based on a correlation between physicochemical property of fragrance and perceptual property of the fragrance.

FIG. 7 is a flowchart conceptually illustrating a bidirectional fragrance property predictor based on a fragrance property prediction system according to an embodiment of the present disclosure. As illustrated in FIG. 7, the fragrance property prediction system 100 according to an embodiment of the present disclosure may perform an operation of predicting perceptual property from physiochemical property, but may be applied as a bidirectional fragrance property prediction system that predicts an opposite direction, that is, predicts chemical property from the perceptual property of target fragrance. For example, the perceptual property of the target fragrance may be received to obtain a physicochemical property coordinate value corresponding thereto based on the known database, a physicochemical property candidate of the target fragrance may be proposed based on a distance between a coordinate value of the perceptual property of the target fragrance and a centroid of each perceptual property.

The fragrance property prediction system 100 described above may be implemented by an application program running on a user terminal or may be embedded in a software form on the user terminal. The user terminal may include a computer, a laptop computer, a smartphone, a pad, a tablet personal computer, or so on which includes a related processor.

According to the present disclosure, it is possible to easily predict the perceptual property of target fragrance simply by inputting the physicochemical property of new fragrance to a predictor constructed on the basis of a correlation between the physicochemical property of fragrance and the perceptual property of the fragrance.

Accordingly, it is possible to synthesize new optimal fragrance through prediction based on preference and fragrance recognition in the fragrance synthesis industry.

In addition, when trying to produce similar fragrances, a fragrance candidate list may be proposed, and through the above effects, resources and efforts required for fragrances, food, chemicals, and odor evaluation industries may be reduced.

Although the present disclosure is described with reference to the embodiments illustrated in the drawings, this is only an example, and those skilled in the art to which the present disclosure belongs will understand that various modifications and equivalent other embodiments may be made therefrom. Therefore, the true technical scope of protection of the present disclosure should be determined by the technical idea of the appended claims.

What is claimed is:

1. A fragrance property prediction system based on a physiochemical and perceptual property database, the fragrance property prediction system comprising:
    a data converter configured to analyze high-dimensional physicochemical property data matched to a plurality of fragrances through a principal component analysis technique and project the analyzed data into three-dimensional data on a three-dimensional physicochemical property coordinate system;
    a grouping unit configured to group three-dimensional coordinates for each fragrance in the three-dimensional physicochemical property coordinate system for each perceptual property category based on perceptual property category information previously matched for each fragrance and configured to calculate a centroid coordinate for each grouped perceptual property category; and
    a controller configured to receive a physicochemical property vector of unknown fragrance and convert the physicochemical property vector into the three-dimensional coordinate in the three-dimensional physicochemical property coordinate system, and predict a perceptual property category of the unknown fragrance based on a distance between the converted three-dimensional coordinate and a centroid for each perceptual property category,
    wherein the controller quantifies the distance d=Ds by using an equation below, compares quantification distances for each category with each other, and classifies the perceptual property categories of the unknown fragrance, $$d' = \left(1 - \frac{D_s}{D}\right) \times 100 \, (\%).$$

where d' indicates a quantification distance, and D indicates a reference distance from a three-dimensional coordinate p on the three-dimensional physicochemical property coordinate system of the unknown fragrance to an original coordinate (0,0,0), and
    wherein the grouping unit labels perceptual property category information to which each fragrance belongs to a corresponding fragrance in the three-dimensional physicochemical property coordinate system, based on the perceptual property category information previously matched for each fragrance, and groups the three-dimensional coordinates for each fragrance by executing an AdaBoost algorithm based on positional information of each labeled fragrance.

2. The fragrance property prediction system of claim 1, further comprising:
a database configured to match high-dimensional physicochemical property data corresponding to the fragrance with perceptual property category information of the fragrance for each of the plurality of fragrances and store the matched data.

3. The fragrance property prediction system of claim 2, wherein
the database utilizes a MOL-instincts database which is a physicochemical property database, and an international fragrance association (IFRA) database which is a perceptual property database.

4. The fragrance property prediction system of claim 1, wherein
the grouping unit obtains a centroid coordinate for each perceptual property category by averaging three-dimensional coordinate positions of respective fragrances classified into the same perceptual property category.

5. The fragrance property prediction system of claim 1, wherein
the controller calculates the distance d between the three-dimensional coordinate p on the three-dimensional physicochemical property coordinate system of the unknown fragrance and a centroid coordinate q of the perceptual property category through a following equation, $$d = |p - q| = \sqrt{(y_{1(p)} - y_{1(q)})^2 + (y_{2(p)} - y_{2(q)})^2 + (y_{3(p)} - y_{3(q)})^2}$$

where $y_{1(p)}$, $y_{2(p)}$, and $y_{3(p)}$ are the three-dimensional coordinates p of the unknown fragrance, and $y_{1(q)}$, $y_{2(q)}$, and $y_{3(q)}$ indicate centroid coordinates of perceptual property categories.

6. The fragrance property prediction system of claim 1, wherein
the controller finally derives a perceptual property category from which a shortest distance is derived among a plurality of perceptual property categories as the perceptual property category of the unknown fragrance.

\* \* \* \* \*